US006771389B1

(12) United States Patent
Sawayama

(10) Patent No.: US 6,771,389 B1
(45) Date of Patent: Aug. 3, 2004

(54) ELECTROPHOTOGRAPHIC IMAGE FORMATION APPARATUS

(75) Inventor: Noboru Sawayama, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 709 days.

(21) Appl. No.: 09/603,921

(22) Filed: Jun. 26, 2000

(30) Foreign Application Priority Data

Jun. 25, 1999 (JP) ........................................... 11-180127

(51) Int. Cl.[7] .......................... G06F 15/03; G03G 13/08

(52) U.S. Cl. .......................... 358/1.7; 358/1.8; 358/1.9; 430/124

(58) Field of Search ........................... 358/1.7, 1.8, 1.9; 399/356, 252, 264, 174, 71, 159; 355/77; 430/126, 66, 112, 124

(56) References Cited

U.S. PATENT DOCUMENTS 5,390,015 A * 2/1995 Nagame et al. ............. 399/356

* cited by examiner

*Primary Examiner*—Twyler Lamb
(74) *Attorney, Agent, or Firm*—Oblon, Spivak, McClelland, Maier & Neustadt, P.C.

(57) ABSTRACT

An electrophotographic image formation apparatus, in which there is used a function-separated type layered photoconductor including an electroconductive support on which an undercoat layer, a charge generation layer, and a charge transport layer are successively overlaid, with the thickness of the undercoat layer, Tul, and the thickness of the charge transport layer, Tctl, satisfying a particular relationship of Tul>Tctl/3 or Tul>Tctl/2.

19 Claims, 4 Drawing Sheets

ELECTROPHOTOGRAPHIC IMAGE FORMATION APPARATUS

BACKGROUND OF THE INVENTION

1. Field of the Invention

The present invention relates to an electrophotographic image formation apparatus, such as an analog copying machine, a digital copying machine, and a printer.

2. Discussion of Background

Conventionally, the following photoconductors are known as electrophotographic photoconductors for use in electrophotographic image formation apparatus:

(1) a single layer photoconductor comprising an electroconductive support 21 and a single photoconductive layer 23 provided on the electroconductive support 21 as schematically shown in FIG. 3;

(2) a function-separated type layered photoconductor for use with incoherent writing light, comprising an electro-conductive support 21, and a layered photoconductive layer comprising a charge generation layer (CGL) 31 and a charge transport layer (CTL) 32, provided on the electroconductive support 21 as schematically shown in FIG. 4; and (3) a function-separated type layered photoconductor for use with coherent writing light, comprising an electroconductive support 21, an undercoat layer (UL) 25 provided on the electroconductive support 21, and a layered photoconductive layer comprising a charge generation layer (CGL) 31 and a charge transport layer (CTL) 32, provided on the undercoat layer (UL) 25 as schematically shown in FIG. 5.

The single layer photoconductor has a simple structure and is inexpensive. However, a sufficiently high photosensitivity for use in practice is difficult to obtain.

The function-separated type layered photoconductor for use with incoherent writing light as shown in FIG. 4 does not include an undercoat layer (UL) or includes an extremely thin undercoat layer (UL), which is as thin as 1 μm or less.

The function-separated type layered photoconductor for use with coherent writing light as shown in FIG. 5 includes an undercoat layer (UL), but the undercoat layer (UL) is still thin.

In the function-separated type layered photoconductor for use with coherent writing light, unless the undercoat layer (UL) 25 is provided, multiple reflections of the coherent writing light is caused between the charge transport layer (CTL) 33 which is the top layer of the photoconductor and the electroconductive layer 21, and the interference of the coherent writing light subjected to multiple reflections causes uneven photosensitivity in the photoconductor, with the formation of adverse interference fringes in reproduced images. In order to prevent the interference, the undercoat layer (UL) 25 is provided. The thickness of the undercoat layer (UL) 25 is several μm, preferably 5 μm or less. The charge transport layer (CTL) 33 usually has a thickness of 20 μm to 40 μm.

In comparison with the single layer photoconductor as shown in FIG. 3, the function-separated type layered photoconductors as shown in FIG. 4 and FIG. 5 have a higher photosensitivity and are mainly used in the field of the currently employed organic photoconductors. However, the charge generation layer (CGL) 31 is provided under the charge transport layer (CTL) 33, so that electric charges generated by the writing light diffuse transversely, repelling each other due to the electric field of each charge in the course of the transfer of the electric charges through the charge transfer layer (CTL) 33. This causes the formation of blurred latent electrostatic images, and accordingly blurred toner images when developed.

It is considered that a method of reducing the thickness of the CTL to 20 μm or less, preferably 15 μm or less could be effective for preventing the formation of such blurred images. However, when the thickness of the CTL is reduced to 20 μm or less, the electrostatic capacity of the photoconductor becomes so large that a sufficient surface potential for image formation cannot be obtained. This phenomenon becomes conspicuous in particular when the thickness of the CTL is 15 μm or less. This is because the withstand electrostatic voltage of the CTL is 40 V/μm to 50 V/μm, so that the photoconductor should be used at 30 V/μm or less to be on the safe side. Therefore, it is preferable that a photoconductor with a thickness of 20 μm be used by being charged to 600 V or less, and with respect to a photoconductor with a thickness of 15 μm, it is preferable that the charging thereof be 450 V or less. In most image formation apparatus in which a cleaning blade is used for cleaning the photoconductor, the thickness of the photoconductor is generally increased to 30 μm to 40 μm with a margin scraped from the surface thereof by the cleaning blade taken into consideration.

The undercoat layer (UL) for use in the conventional photoconductor for use with the coherent writing light can take over a partial voltage of only about 20% of the voltage with which the photoconductor is charged, which partial voltage is not sufficient for preventing the electrostatic breakdown of the photoconductor.

Furthermore, by reducing the thickness of the CTL, there can be prevented the diffusion of electric charges generated within the CGL, which is caused by the mutual repulsion of the electric field of each electric charge in the course of the transfer of the electric charges through the CTL. However, in the case where the thickness of the CTL is merely reduced, the surface potential of the photoconductor decreases if electric charges are applied thereto under the same conditions as in the case where the thickness of the CTL is not reduced, and therefore satisfactory development cannot be carried out by merely reducing the thickness of the CTL. Some conventional photoconductor with such a CTL with a reduced thickness is not capable of clearly reproducing low-contrast thin line images, or utterly unable to produce such line images.

In conventional photoconductors for analog writing, the UL has such a thickness that is sufficient for preventing charge injection from the electroconductive support into the CGL and the CTL, or for making it possible to perform the pretreatment of the electroconductive support for uniformly providing the CGL on the electroconductive support by coating. Therefore, the undercoat layer is extremely thin, with By reducing the thickness of the charge transport layer, there can be prevented the diffusion of electric charges generated within the charge generation layer, which is caused by the mutual repulsion of the electric field of each electric charge in the course of the transfer of the electric charges through the charge transport layer. However, in the case where the thickness of the charge transport layer is reduced, the surface potential of the photoconductor decreases if electric charges are applied thereto under the same conditions, sufficient satisfactory development for use in practice cannot be carried out. Some conventional photoconductor with such a reduced charge transport layer is not capable of clearly reproducing low-contrast thin line images, or completely unable to produce such line images in some cases.

In such conventional photoconductors for analog writing, the undercoat layer has such a thickness that is sufficient for preventing charge injection from the electroconductive support into the charge generation layer or the charge transport layer, or for making it possible to perform pretreatment to the electroconductive support for uniformly coating the CGL on the electroconductive support. Therefore, the UL is extremely thin, with such a thickness that is negligible in comparison with the thickness of the CTL.

Furthermore, even when an LED is used for digital writing, the light from the LED is incoherent light, so that in the function-separated type layered photoconductor for use with the LED, it is unnecessary to cause the UL to have a light scattering function, and therefore, even in this case, the UL has such a thickness that is negligible in comparison with the thickness of the CTL.

In the conventional function-separated type layered photoconductor either for analog writing or digital writing, as long as incoherent light is used for writing, thin line images which are recorded with a relatively small amount of energy, cannot be reproduced with high image formation performance by merely decreasing the thickness of the CTL.

SUMMARY OF THE INVENTION

It is therefore an object of the present invention to provide an electrophotographic image formation apparatus capable of preventing the formation of blurred images, with excellent image formation performance and accordingly with excellent image development performance.

This object of the present invention can be achieved by use of a function-separated type photoconductor in an electrophotographic image formation apparatus, which function-separated type photoconductor comprises an electroconductive substrate on which an undercoat layer, a charge generation layer and a charge transport layer are successively overlaid, to which undercoat layer high voltage resistance is imparted by increasing the thickness thereof, thereby imparting high surface potential to the photoconductor.

More specifically, the present invention can be achieved by an image formation apparatus comprising:

a photoconductor capable of forming a latent electrostatic image thereon, charging means for charging the surface of the photoconductor, image exposure means for exposing the charged surface of the photoconductor to a light image corresponding to an original image to be reproduced, through an optical lens, using part of light to which the original image is exposed, and development means for developing the latent electrostatic image to a visible image, wherein the photoconductor is a function-separated type photoconductor comprising (a) an electroconductive support, (b) an undercoat layer with a thickness of Tul formed on the electroconductive support, (c) a charge generation layer formed on the undercoat layer, and (d) a charge transport layer with a thickness of Tctl, which is 20 $\mu$m or less, formed on the charge generation layer, Tul and Tctl satisfying a relationship of Tul>Tctl/3.

In the above image formation apparatus, it is preferable that Tul and Tctl satisfy a relationship of Tul>Tctl/2.

The object of the present invention can also be achieved by an image formation apparatus comprising:

a photoconductor capable of forming a latent electrostatic image thereon, charging means for charging the surface of the photoconductor, image exposure means for exposing the charged surface of the photoconductor to a light image corresponding to an original image to be reproduced, using incoherent light, with the light image being divided into picture elements, and development means for developing the latent electrostatic image to a visible image, wherein the photoconductor is a function-separated type photoconductor comprising (a) an electroconductive support, (b) an undercoat layer with a thickness of Tul formed on the electroconductive support, (c) a charge generation layer formed on the undercoat layer, and (d) a charge transport layer with a thickness of Tctl, which is 20 $\mu$m or less, formed on the charge generation layer, Tul and Tctl satisfying a relationship of Tul>Tctl/3.

In the above image formation apparatus, it is preferable that Tul and Tctl satisfy a relationship of Tul>Tctl/2.

The present invention can also be achieved by an image formation apparatus comprising:

a photoconductor capable of forming a latent electrostatic image thereon, charging means for charging the surface of the photoconductor, image exposure means for exposing the charged surface of the photoconductor to a light image corresponding to an original image to be reproduced, using coherent light, with the light image being divided into picture elements, and development means for developing the latent electrostatic image to a visible image, wherein the photoconductor is a function-separated type photoconductor comprising (a) an electroconductive support, (b) an undercoat layer with a thickness of Tul formed on the electroconductive support, (c) a charge generation layer formed on the undercoat layer, and (d) a charge transport layer with a thickness of Tctl, which is 20 $\mu$m or less, formed on the charge generation layer, Tul and Tctl satisfying a relationship of Tul>Tctl/2.

In the above image formation apparatus, it is preferable that Tul and Tctl satisfy a relationship of Tul>Tctl.

The present invention can also be achieved by an image formation apparatus comprising:

a photoconductor capable of forming a latent electrostatic image thereon, charging means for charging the surface of the photoconductor, image exposure means for exposing the charged surface of the photoconductor to a light image corresponding to an original image having an image data including gradation information to be reproduced, using incoherent light, with the light image being divided into picture elements, development means for developing the latent electrostatic image to a visible image, and gradation representing means for representing an image formation method based on gradation, wherein the gradation representing means is capable of inputting a driving signal to the image exposure means for controlling the image exposure means, based on the image data of the original image, the driving signal having a predetermined minimum value, the photoconductor being a function-separated type photoconductor comprising (a) an electroconductive support, (b) an undercoat layer with a thickness of Tul formed on the electroconductive support, (c) a charge generation layer formed on the undercoat layer, and (d) a charge transport layer with a thickness of Tctl, which is 20 μm or less, formed on the charge generation layer, Tul and Tctl satisfying a relationship of Tul>Tctl/2, the photoconductor having such a differential sensitivity that is not more than ⅓ a maximum differential sensitivity of the photoconductor at a maximum exposure in an exposure distribution on the surface of the photoconductor at the predetermined minimum value of the driving signal, wherein the exposure distribution is represented by E(x,y) [joule/$m^2$] calculated by integrating a writing light energy distribution P(x, y, t) [watt/$m^2$] with respect to an exposure time (t), where (x, y) is a coordinate on the surface of the photoconductor, and an exposure diameter Db satisfying a relationship of Db>Tctl, wherein the exposure diameter Db is a smaller exposure diameter of an exposure diameter measured in a main scanning direction or an exposure diameter measured in a sub-scanning direction in an area on the surface of the photoconductor at ½ the maximum exposure or more in the exposure distribution on the surface of the photoconductor at the predetermined minimum value of the driving signal.

In the above image formation apparatus, it is preferable that Tul and Tctl satisfy a relationship of Tul>Tctl.

The present invention can also be achieved by an image formation apparatus comprising:

a photoconductor capable of forming a latent electrostatic image thereon, charging means for charging the surface of the photoconductor, image exposure means for exposing the charged surface of the photoconductor to a light image corresponding to an original image having gradation information to be reproduced, using coherent light, with the light image being divided into picture elements, development means for developing the latent electrostatic image to a visible image, and gradation representing means for representing an image formation method based on gradation, wherein the gradation representing means is capable of inputting a driving signal to the image exposure means for controlling the image exposure means, based on the image data of the original image, the driving signal having a predetermined minimum value, the photoconductor being a function-separated type photoconductor comprising (a) an electroconductive support, (b) an undercoat layer with a thickness of Tul formed on the electroconductive support, (c) a charge generation layer formed on the undercoat layer, and (d) a charge transport layer with a thickness of Tctl, which is 20 μm or less, formed on the charge generation layer, Tul and Tctl satisfying a relationship of Tul>Tctl/2, the photoconductor having such a differential sensitivity that is not more than ⅓ a maximum differential sensitivity of the photoconductor at a maximum exposure in an exposure distribution on the surface of the photoconductor at the predetermined minimum value of the driving signal, wherein the exposure distribution is represented by E(x,y) [joule/$m^2$] calculated by integrating a writing light energy distribution P(x, y, t) [watt/$m^2$] with respect to an exposure time (t), where (x, y) is a coordinate on the surface of the photoconductor, and an exposure diameter Db satisfying a relationship of Db>2 Tctl, wherein the exposure diameter Db is a smaller exposure diameter of an exposure diameter measured in a main scanning direction or an exposure diameter measured in a sub-scanning direction in an area on the surface of the photoconductor at ½ the maximum exposure or more in the exposure distribution on the surface of the photoconductor at the predetermined minimum value of the driving signal.

In the above image formation apparatus, it is preferable that Tul and Tctl satisfy a relationship of Tul>Tctl.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
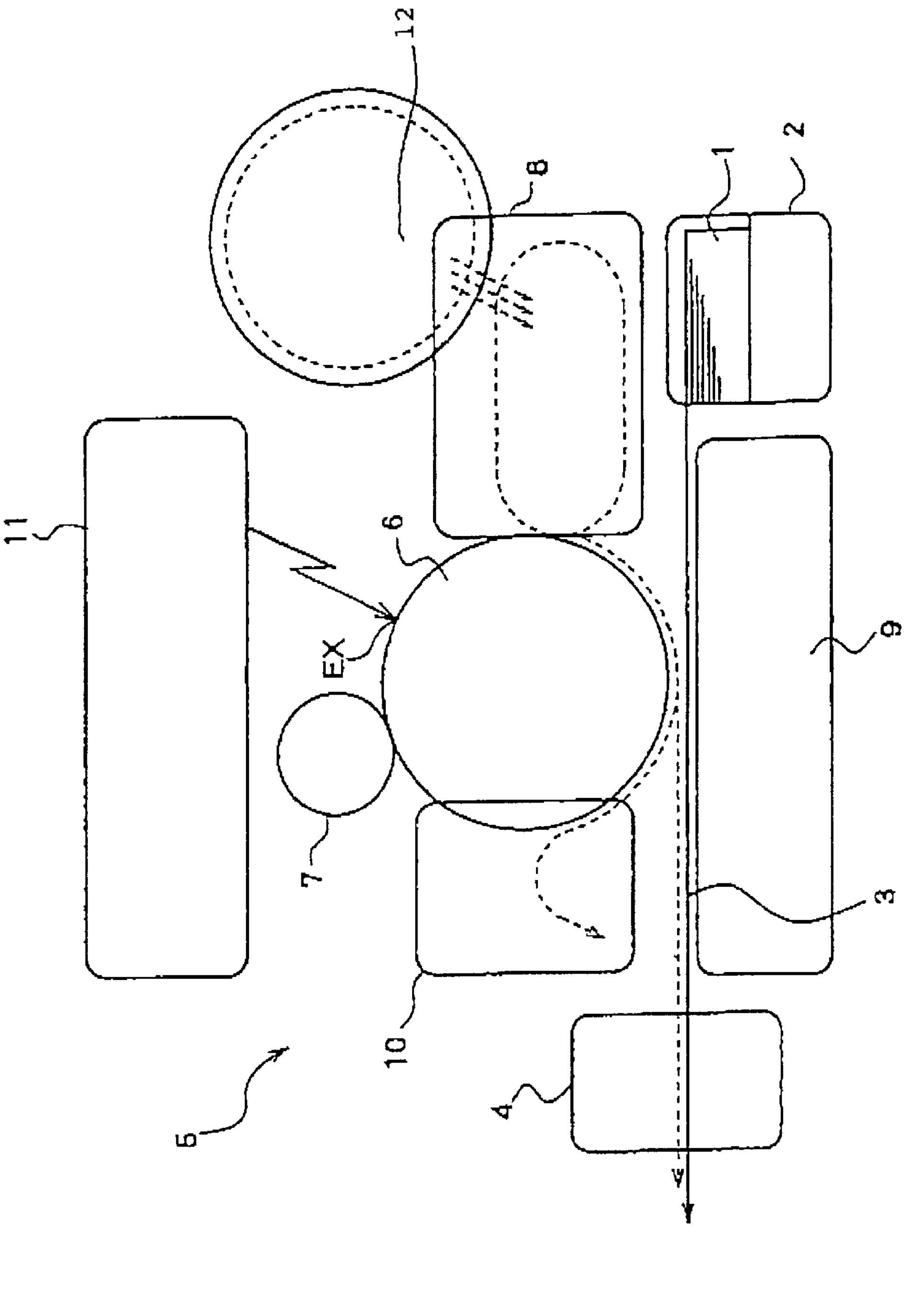
FIG. 1 is a schematic illustration of an electrophotographic image formation apparatus of the present invention.

In sharp contrast to the above-mentioned conventional photoconductors, in a first image formation apparatus of the present invention, which is for analog writing, comprising a photoconductor capable of forming a latent electrostatic image thereon, charging means for charging the surface of the photoconductor, image exposure means for exposing the charged surface of the photoconductor to a light image corresponding to an original image to be reproduced, through an optical lens, using part of light to which the original image is exposed, and development means for developing the latent electrostatic image to a visible image, as the photoconductor, there is employed a function-separated type photoconductor which comprises (a) an electroconductive support, (b) an undercoat layer with a thickness of Tul formed on the electroconductive support, (c) a charge generation layer formed on the undercoat layer, and (d) a charge transport layer with a thickness of Tctl, which is 20 μm or less, formed on the charge generation layer, Tul and Tctl satisfying a relationship of Tul>Tctl/3.

The photoconductor with the above-mentioned structure can secure sufficiently high surface potential and therefore is capable of clearly reproducing even low-contrast thin line images.

In the above image formation apparatus, it is preferable to employ such a photoconductor that satisfies a relationship of Tul>Tctl/2, in which the thickness of the undercoat layer Tul is further increased, since further improved effects can be obtained by use of the photoconductor.

In a second image formation apparatus of the present invention, which is for digital writing with incoherent light, comprising a photoconductor capable of forming a latent electrostatic image thereon, charging means for charging the surface of the photoconductor, image exposure means for exposing the charged surface of the photoconductor to a light image corresponding to an original image to be reproduced, using incoherent light, with the light image being divided into picture elements, and development means for developing the latent electrostatic image to a visible image, as the photoconductor, there is employed a function-separated type photoconductor comprising (a) an electroconductive support, (b) an undercoat layer with a thickness of Tul formed on the electroconductive support, (c) a charge generation layer formed on the undercoat layer, and (d) a charge transport layer with a thickness of Tctl, which is 20 $\mu$m or less, formed on the charge generation layer, Tul and Tctl satisfying a relationship of Tul>Tctl/3.

The photoconductor with the above-mentioned structure can secure sufficiently high surface potential and therefore is capable of clearly reproducing even line images written with a relatively low light energy or a highlight portion written with a relatively weak light.

In the above image formation apparatus, it is preferable to employ such a photoconductor that satisfies a relationship of Tul>Tctl/2, in which the thickness of the undercoat layer Tul is further increased, since further improved effects can be obtained by use of the photoconductor.

In the above image formation apparatus, a LED array can be used for digital writing, since the light from the LED array is incoherent light.

In a third image formation apparatus of the present invention, which is for digital writing with coherent light, comprising a photoconductor capable of forming a latent electrostatic image thereon, charging means for charging the surface of the photoconductor, image exposure means for exposing the charged surface of the photoconductor to a light image corresponding to an original image to be reproduced, using coherent light, with the light image being divided into picture elements, and development means for developing the latent electrostatic image to a visible image, as the photoconductor, there is employed a function-separated type photoconductor comprising (a) an electroconductive support, (b) an undercoat layer with a thickness of Tul formed on the electroconductive support, (c) a charge generation layer formed on the undercoat layer, and (d) a charge transport layer with a thickness of Tctl, which is 20 $\mu$m or less, formed on the charge generation layer, Tul and Tctl satisfying a relationship of Tul>Tctl/2. The photoconductor with the above-mentioned structure can secure sufficiently high surface potential and therefore is capable of clearly reproducing even line images written with a relatively low light energy or a highlight portion written with a relatively weak light.

In the above image formation apparatus, it is preferable to employ such a photoconductor that satisfies a relationship of Tul>Tctl/2, in which the thickness of the undercoat layer Tul is further increased, since further improved effects can be obtained by use of the photoconductor.

In the above image formation apparatus, a LD can be used for digital writing with coherent light.

In a fourth image formation apparatus of the present invention, which is for digital writing with incoherent light, comprising a photoconductor capable of forming a latent electrostatic image thereon, charging means for charging the surface of the photoconductor, image exposure means for exposing the charged surface of the photoconductor to a light image corresponding to an original image having an image data including gradation information to be reproduced, using incoherent light, with the light image being divided into picture elements, development means for developing the latent electrostatic image to a visible image, and gradation representing means for representing an image formation method based on gradation, wherein the gradation representing means is capable of inputting a driving signal to the image exposure means for controlling the image exposure means, based on the image data of the original image, the driving signal having a predetermined minimum value, as the photoconductor, there is employed a function-separated type photoconductor comprising (a) an electroconductive support, (b) an undercoat layer with a thickness of Tul formed on the electroconductive support, (c) a charge generation layer formed on the undercoat layer, and (d) a charge transport layer with a thickness of Tctl, which is 20 $\mu$m or less, formed on the charge generation layer, Tul and Tctl satisfying a relationship of Tul>Tctl/2, the photoconductor having such a differential sensitivity that is not more than ⅓ a maximum differential sensitivity of the photoconductor at a maximum exposure in an exposure distribution on the surface of the photoconductor at the predetermined minimum value of the driving signal, wherein the exposure distribution is represented by E(x,y) [joule/$m^2$] calculated by integrating a writing light energy distribution P(x, y, t) [watt/$m^2$] with respect to an exposure time (t), where (x, y) is a coordinate on the surface of the photoconductor, and an exposure diameter Db satisfying a relationship of Db>Tctl, wherein the exposure diameter Db is a smaller exposure diameter of an exposure diameter measured in a main scanning direction or an exposure diameter measured in a sub-scanning direction in an area on the surface of the photoconductor at ½ the maximum exposure or more in the exposure distribution on the surface of the photoconductor at the predetermined minimum value of the driving signal.

The photoconductor with the above-mentioned structure can secure sufficiently high surface potential and minimize the spreading of electric charges, and is capable of reproducing isolated dots written with a minimum writing energy in a stable manner.

In the above image formation apparatus, it is preferable to employ such a photoconductor that satisfies a relationship of Tul>Tctl, in which the thickness of the undercoat layer Tul is further increased, since further improved effects can be obtained by use of the photoconductor.

In a fifth image formation apparatus of the present invention, which is for digital writing with coherent light, comprising a photoconductor capable of forming a latent electrostatic image thereon, charging means for charging the surface of the photoconductor, image exposure means for exposing the charged surface of the photoconductor to a light image corresponding to an original image having an image data including gradation information to be reproduced, using coherent light, with the light image being divided into picture elements, development means for developing the latent electrostatic image to a visible image, and gradation representing means for representing an image formation method based on gradation, wherein the gradation representing means is capable of inputting a driving signal to the image exposure means for controlling the image exposure means, based on the image data of the original image, the driving signal having a predetermined minimum value, as the photoconductor, there is employed a function-separated type photoconductor comprising (a) an electroconductive support, (b) an undercoat layer with a thickness of Tul formed on the electroconductive support, (c) a charge generation layer formed on the undercoat layer, and (d) a charge transport layer with a thickness of Tctl, which is 20 $\mu$m or less, formed on the charge generation layer, Tul and Tctl satisfying a relationship of Tul>Tctl/2, the photoconductor having such a differential sensitivity that is not more than ⅓ a maximum differential sensitivity of the photoconductor at a maximum exposure in an exposure distribution on the surface of the photoconductor at the predetermined minimum value of the driving signal, wherein the exposure distribution is represented by E(x,y) [joule/$m^2$] calculated by integrating a writing light energy distribution P(x, y, t) [watt/$m^2$] with respect to an exposure time (t), where (x, y) is a coordinate on the surface of the photoconductor, and an exposure diameter Db satisfying a relationship of Db>2 Tctl, wherein the exposure diameter Db is a smaller exposure diameter of an exposure diameter measured in a main scanning direction or an exposure diameter measured in a sub-scanning direction in an area on the surface of the photoconductor at ½ the maximum exposure or more in the exposure distribution on the surface of the photoconductor at the predetermined minimum value of the driving signal.

The photoconductor with the above-mentioned structure can secure sufficiently high surface potential and minimize the spreading of electric charges, and is capable of reproducing isolated dots written with a minimum writing energy in a stable manner.

In the above image formation apparatus, it is preferable to employ such a photoconductor that satisfies a relationship of Tul>Tctl, in which the thickness of the undercoat layer Tul is further increased, since further improved effects can be obtained by use of the photoconductor.

The "exposure diameter Db" defined in the above-mentioned fourth and fifth image formation apparatus of the present invention can be determined, for example, as follows:

When exposure is conducted with an exposure width of 34 $\mu$m in a main scanning direction, using a laser exposing apparatus with an exposure beam having such a power distribution that is a Gaussian distribution with a ½ diameter of 30 $\mu$m in the main scanning direction, and a ½ of 50 $\mu$m, the exposure distribution is such a Gaussian distribution with an approximate half-value diameter in the main scanning direction of 40 $\mu$m and an approximate half-value diameter in the sub-scanning direction of 50 $\mu$m. In this case, the exposure diameter Db is determined as being 40 $\mu$m.

The "differential sensitivity" of the photoconductor can be defined in terms of the relationship between (1) a potential V(E) which is obtained when an area with a size on the surface of a photoconductor from which the light characteristics of the photoconductor can be measured is substantially uniformly exposed to light, and (2) the exposure E, using a light of an image exposing apparatus, or a light with substantially the same wavelength as that of the light of the image exposing apparatus.

More specifically, the "differential sensitivity" of the photoconductor can be defined by the following formula:

$$\text{Differential sensitivity}=[V(E+\Delta E)-V(E)]/\Delta E$$

wherein E is the exposure, and V(E) is the surface potential of the photoconductor when the photoconductor is exposed with the exposure E, and V(E+ΔE) is the surface potential of the photoconductor when the exposure E is increased by ΔE.

Generally, the differential sensitivity is decreased as the exposure is increased.

The photoconductor for use in the image formation apparatus of the present invention will now be explained in detail with respect to the structure and effects thereof.

The photoconductor has a capacity of Cpc, which is given by the following formula:

$$Cpc=1(\epsilon ctl\cdot Tctl+\epsilon cgl\cdot Tcgl+\epsilon ul\cdot Tul)$$

wherein ϵctl, ϵul and ϵcgl are respectively dielectric constants of the CTL, the UL, and the CGL, and generally, ϵctl≈ϵul≈ϵcgl=3.

In a conventional photoconductor for analog writing, Tctl>>Tcgl≈Tul, so that it can be said that the capacity of the photoconductor is substantially inversely proportional to the thickness of the charge transport layer, Tctl. In other words, the thinner the charge transport layer, the greater the capacity of the photoconductor, that is, the smaller Tctl, the greater Cpc.

On the other hand, the quantity of charges, Q, that can be applied to the photoconductor cannot be increased without limitation due to various restrictions imposed thereon. Therefore, when the thickness of the charge transport layer, Tctl, is reduced, there may be a case where a sufficiently high surface potential of the photoconductor required for a practical image formation process cannot be obtained, which surface potential of the photoconductor is given by the following formula:

$$Vpc=Q/Cpc$$

In sharp contrast to this, in the present invention, the relationship of Tul>Tctl/2 or Tul>Tctl/3 is satisfied, whereby a surface potential necessary for the development of images can be secured by the application of necessary, but minimum charges thereto, without unnecessarily increasing the electrostatic capacity of the photoconductor because the thickness of the undercoat layer, Tul, is increased to such an extent that cannot be ignored, even though the thickness of the charge transport layer, Tctl, is reduced, thereby reducing the diffusion of electric charges within the charge transfer layer and the formation of blurred latent electrostatic images.

Thus, according to the present invention, a sufficient surface potential for the development of images can be secured, and low-contrast thin line images, which are usually difficult to reproduce, can be clearly reproduced.

The function of the function-separated type layered photoconductor comprising the electroconductive support, the undercoat layer (UL) formed on the electroconductive support, the charge generation layer (CGL) formed on the undercoat layer, and the charge transport layer (CTL) formed on the charge generation layer (CGL), when used in an analog electrophotographic copying machine, will now be explained.

In the course of forming the CTL on the CGL by a wet coating method, a coating liquid for the formation of the CTL penetrates the CGL, so that a charge transport material (CTM) contained in the CTL surrounds a charge generation material (CGM) contained in the CGL, and comes into contact with the CGM, and the interface between the CTM and the CGM constitutes a charge generation site.

When the surface of the photoconductor is uniformly charged to a predetermined polarity (for instance, to a negative polarity) by a charger, charges with an opposite polarity to the predetermined polarity (for instance, to a positive polarity) are induced at the electroconductive support. The resistivity of an organic photoconductor in the dark is so high that it may be considered that there is no charge injection (for instance, no injection of positive holes) at the electroconductive support. Therefore, it is considered that there are no true charges in the CGL, that is, around the CGM. In other words, the voltage applied across the CTL and the electroconductive support is borne by the CTL and the UL. Part of the voltage is also allotted to the CGL. However, the CGL is so thin that the voltage allotted to the CGL is negligible.

When the surface of the photoconductor is irradiated with light emitted from an exposure unit, a predetermined per cent of the light is absorbed by the CGM and excitons are generated in the CGM and diffuse in the CGM. When the excitons reach the charge generation site, electrons and positive holes are generated in pairs (refer to FIG. 6 and FIG. 7, provided that the UL and the electroconductive layer are not shown in FIG. 6).

The positive holes are attracted by the negative charges at the surface of the photoconductor and are conducted through the CTL by hopping through the CTM. The positive holes reach the surface of the photoconductor and neutralize the charges at the surface of the photoconductor. During this conduction, the positive holes repel each other by the charges thereof, spread transversely and form a surface charge distribution which is larger than the diameter of a light spot, in an obscure form. The electrons, which are one party of each generated pair of the electron and the positive hole, are also considered to spread through the UL and are conducted likewise. However, the electrons do not form an obscure spreading with a counter charge. This is because the counter charges are present within the electroconductive support, so that the charges are rearranged and the above-mentioned distribution depend on the surface charges neutralized by the positive holes. In other words, the spreading of the charges within the UL can be ignored, and only the CTL contributes to the spreading of the charges.

Figure 6:
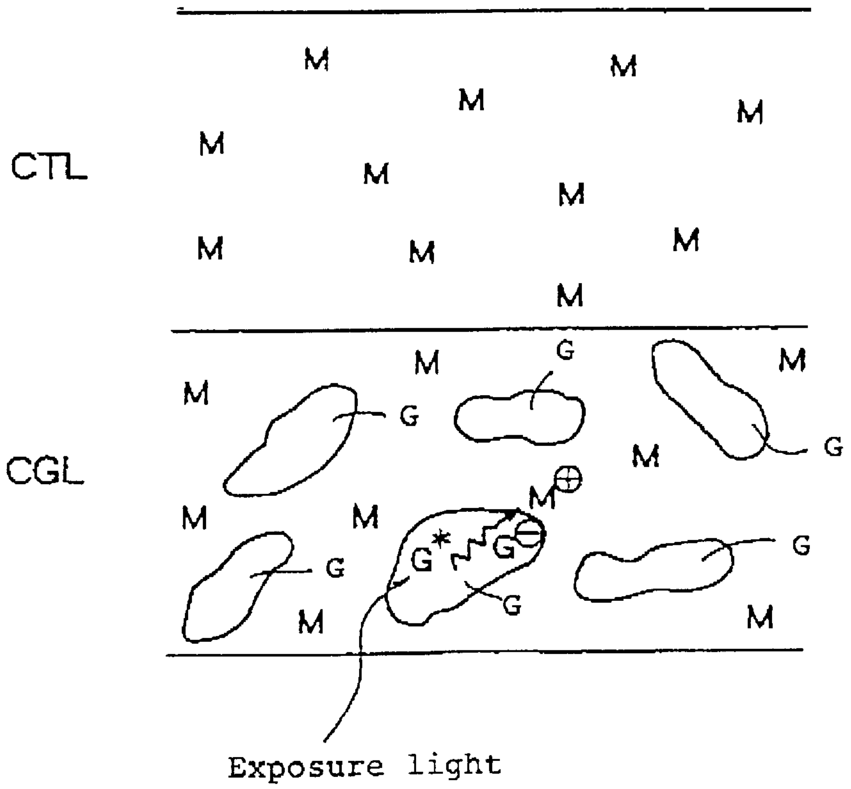
FIG. 6 is a schematic cross-sectional diagram of the structure of a function-separated type layered photoconductor prepared by a wet coating method.

In FIG. 6, M indicates a CTM molecule, G indicates a CGM molecule, and G* indicates an excited CGM molecule. The CTM molecules indicated by M in the CGL are those from the CTL and are penetrated into the CGL in the course of the coating of the CTL on the CGL and the drying the coated CTL. A photo-carrier generation site is present at the interface of the CGM and the CTM at a molecular level thereof in the CGL.

Figure 7:
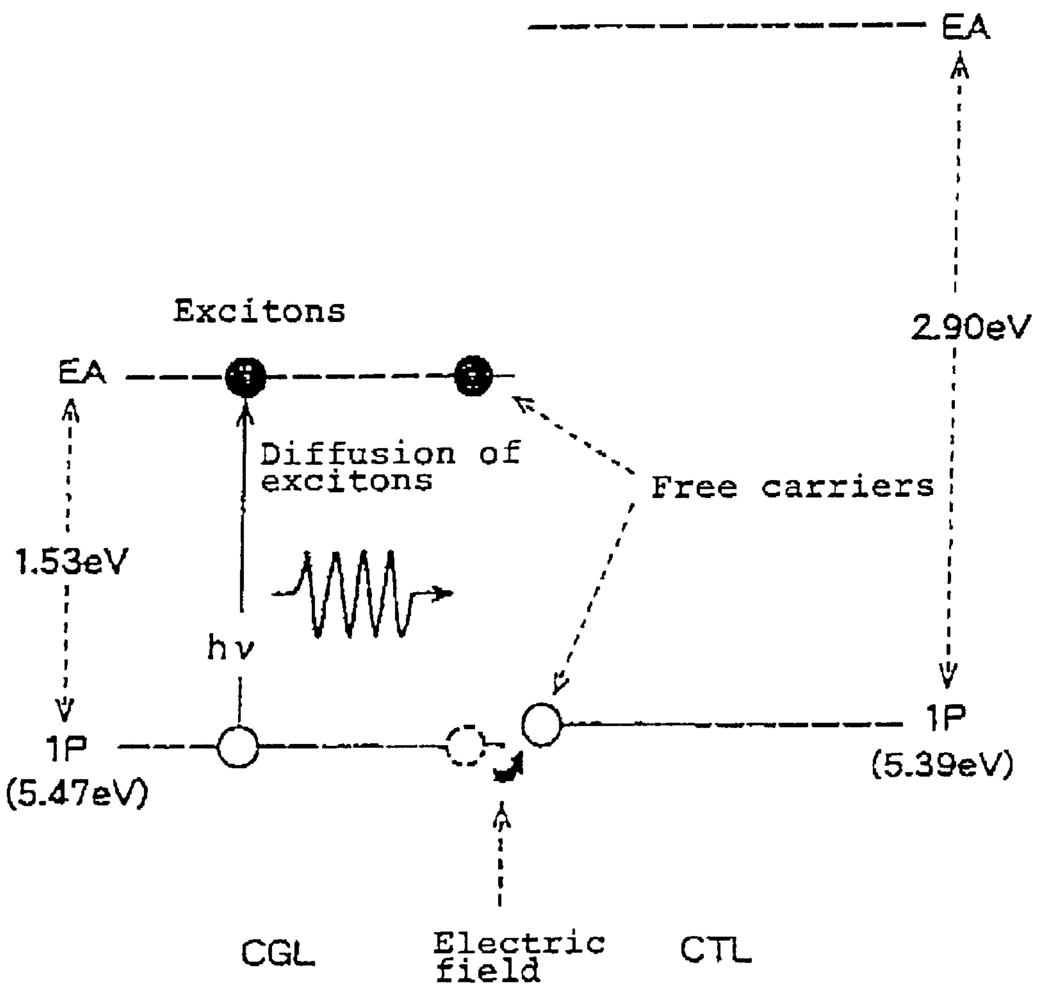
FIG. 7 is a diagram in explanation of the generation of photo carriers in the function-separated type layered photoconductor.

FIG. 7 is a schematic diagram for explanation of the photo carriers in the layered photoconductor, indicating that the absorption of photons, and the generation of carriers take place at different sites, and that the generation of carriers and the injection of carriers take place simultaneously.

Other features of this invention will become apparent in the course of the following description of exemplary embodiments, which are given for illustration of the invention and are not intended to be limiting thereof.

EXAMPLE 1

FIG. 1 schematically shows an image formation apparatus of the present invention, which is an analog electrophotographic copying machine for analog writing with incoherent. In FIG. 1, reference numeral 1 indicates image transfer sheets; reference numeral 2, a sheet feeding unit; reference numeral 3, a sheet transportation belt; reference numeral 4, an image fixing unit; reference numeral 5, an image formation apparatus of the present invention; reference numeral 6, a photoconductor; reference numeral 7, a charging unit; reference numeral 8, a development unit; a reference numeral 9, an image transfer unit; reference numeral 10, a cleaning unit; and reference numeral 11, an exposure unit.

Figure 2:
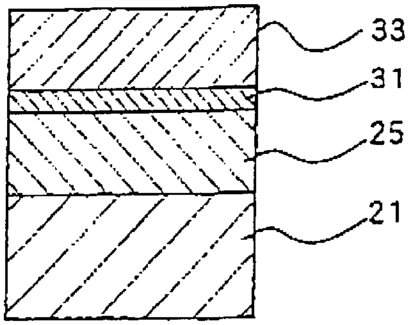
FIG. 2 is a schematic cross-sectional view of an example of a function-separated type layered photoconductor for use in the electrophotographic image formation apparatus of the present invention.
Figure 3:
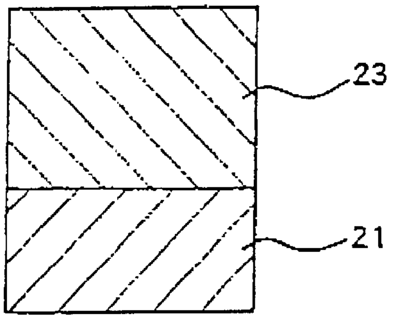
FIG. 3 PRIOR ART
FIG. 3 is a schematic cross-sectional view of an example of a conventional single layer photoconductor.
Figure 4:
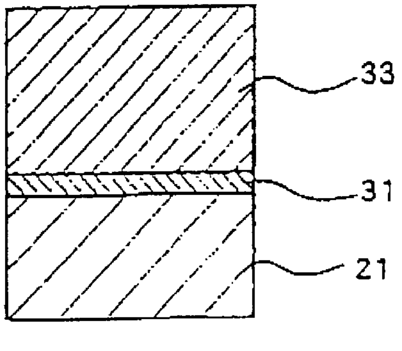
FIG. 4 PRIOR ART
FIG. 4 is a schematic cross-sectional view of an example of a conventional function-separated type layered photoconductor.
Figure 5:
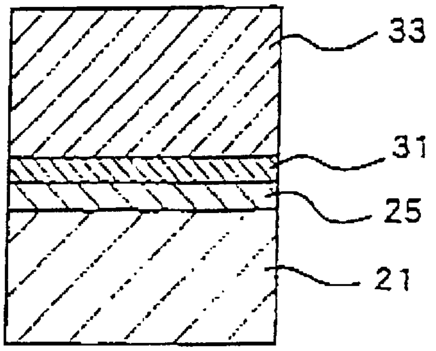
FIG. 5 PRIOR ART
FIG. 5 is a schematic cross-sectional view of another example of a conventional function-separated type layered photoconductor.

FIG. 2 is a schematic cross-sectional view of an example of a function-separated type layered photoconductor for use in the image formation apparatus of the present invention. In FIG. 2, reference numeral 21 indicates an electroconductive support; reference numeral 25, an undercoat layer (UL); reference numeral 31, a charge generation layer (CGL); and reference numeral 33, a charge transport layer (CTL).

In this example, the function-separated type layered photoconductor was formed with the CTL and the UL respectively having a thickness of 20 $\mu$m and a thickness of 10 $\mu$m in the above-mentioned structure.

The thus formed function-separated type layered photoconductor was incorporated in the above-mentioned image formation apparatus and then uniformly charged so as to have a surface potential of −700 V, and a latent electrostatic image corresponding to an original image to be reproduced was formed thereon with such an exposure using incoherent light that the surface potential of the photoconductor in an area thereof corresponding to the background of the original image to be reproduced with a reflection density of 0.1, was −80 V.

The thus formed latent electrostatic image was developed to a toner image with positive-positive development, using a two-component developer composed of a positively charged toner and a carrier, with the application of a development bias voltage of −200 V. The result was that low-contrast thin line images were reproduced with high quality. This development performance was the same even when the same image reproduction was continued for an extended period of time.

EXAMPLE 2

The image formation apparatus used in Example 1 was modified to make it a digital electrophotographic copying machine for digital writing by use of an LED array for digital writing with incoherent light with a writing density of 600 dpi in both the main scanning direction and the sub-scanning direction in the exposure unit 11.

The writing by the LED array was made adjustable with multiple values of 0, 1/4, 2/4, 3/4 and 4/4 in terms of relative lighting time in accordance with image data.

The function-separated type layered photoconductor employed in Example 1 was replaced by a function-separated type layered photoconductor with the CTL and the UL respectively having a thickness of 15 $\mu$m and a thickness of 6 $\mu$m in the same structure as shown in FIG. 2.

The thus formed function-separated type layered photoconductor was uniformly charged so as to have a surface potential of −600 V.

A latent electrostatic image corresponding to an original image to be reproduced was formed thereon with the adjustment of the exposure in such a manner that the surface potential of the photoconductor was −120 V when the exposure for successive picture elements was conducted with the maximum relative exposure time of 4/4 in the area with a size on the surface of the photoconductor from which the light decay characteristics of the photoconductor can be measured.

The thus formed latent electrostatic image was developed to a toner image with negative-positive development, using a two-component developer composed of a negatively charged toner and a carrier, with the application of a development bias voltage of −400 V. The result was that excellent development was made even when one dot line was reproduced with the minimum relative exposure time of 1/4. This development performance was the same even when the same image reproduction was continued for an extended period of time.

EXAMPLE 3

The image formation apparatus used in Example 1 was modified to make it a digital electrophotographic copying machine for digital writing by use of an LD for digital writing with coherent light with a writing density of 600 dpi in both the main scanning direction and the sub-scanning direction in the exposure unit 11.

The writing by the LD was made adjustable with multiple values of 256 steps including 0/255 to 255/255, in terms of power in accordance with image data.

The function-separated type layered photoconductor employed in Example 1 was replaced by a function-separated type layered photoconductor with the CTL and the UL respectively having a thickness of 15 $\mu$m and a thickness of 10 $\mu$m in the same structure as shown in FIG. 2.

The thus formed function-separated type layered photoconductor was uniformly charged so as to have a surface potential of −600 V.

A latent electrostatic image corresponding to an original image to be reproduced was formed thereon with the adjustment of the exposure in such a manner that the surface potential of the photoconductor was −150 V when the exposure for successive picture elements was conducted with the maximum power of 255/255 in the area with a size on the surface of the photoconductor from which the light decay characteristics of the photoconductor can be measured.

The thus formed latent electrostatic image was developed to a toner image with negative-positive development, using a two-component developer composed of a negatively charged toner and a carrier, with the application of a development bias voltage of −400 V. The result was that excellent development was made even when one dot line was reproduced with the power of 16/255. This development performance was the same even when the same image reproduction was continued for an extended period of time.

EXAMPLE 4

The image formation apparatus used in Example 1 was modified to make it a digital electrophotographic copying machine for digital writing by use of an LED array for digital writing with incoherent light with a writing density of 600 dpi in both the main scanning direction and the sub-scanning direction in the exposure unit 11.

The writing by the LED array was made adjustable with multiple values of 0, 1/3, 2/3, and 3/3 in terms of relative lighting time in accordance with image data.

The function-separated type layered photoconductor employed in Example 1 was replaced by a function-separated type layered photoconductor with the CTL and the UL respectively having a thickness of 12 $\mu$m and a thickness of 6 $\mu$m in the same structure as shown in FIG. 2.

The thus formed function-separated type layered photoconductor was uniformly charged so as to have a surface potential of −500 V.

A latent electrostatic image corresponding to an original image to be reproduced was formed thereon with the exposure being adjusted in such a manner that the surface potential of the photoconductor was −60 V when the exposure for successive picture elements was conducted with the maximum relative exposure time of 3/3 in the area with a size on the surface of the photoconductor from which the light decay characteristics of the photoconductor can be measured.

The thus formed latent electrostatic image was developed to a toner image with negative-positive development, using a two-component developer composed of a negatively charged toner and a carrier, with the application of a development bias voltage of −330 V. The result was that excellent development was made even when isolated one dot was reproduced. This development performance was the same even when the same image reproduction was continued for an extended period of time.

EXAMPLE 5

The image formation apparatus used in Example 1 was modified to make it a digital electrophotographic copying machine for digital writing by use of an LD for digital writing with coherent light with a writing density of 600 dpi in both the main scanning direction and the sub-scanning direction in the exposure unit 11.

The writing by the LD was made adjustable with two values of ON/OFF in terms of the lighting of the LD in accordance with image data.

The function-separated type layered photoconductor employed in Example 1 was replaced by a function-separated type layered photoconductor with the CTL and the UL respectively having a thickness of 10 $\mu$m and a thickness of 10 $\mu$m in the same structure as shown in FIG. 2.

The thus formed function-separated type layered photoconductor was uniformly charged so as to have a surface potential of −500 V.

A latent electrostatic image corresponding to an original image to be reproduced was formed thereon with the adjustment of the exposure in such a manner that the surface potential of the photoconductor was −70 V when the exposure for successive picture elements was conducted with the lighting of the LD ON in the area with a size on the surface of the photoconductor from which the light decay characteristics of the photoconductor can be measured.

The thus formed latent electrostatic image was developed to a toner image with negative-positive development, using a two-component developer composed of a negatively charged toner and a carrier, with the application of a development bias voltage of −350 V. The result was that excellent development was made even when an isolated one dot was reproduced. This development performance was the same even when the same image reproduction was continued for an extended period of time.

Japanese Patent Application No. 11-180127 filed Jun. 25, 1999 is hereby incorporated by reference.

What is claimed is:

1. An image formation apparatus comprising:

a photoconductor capable of forming a latent electrostatic image thereon;

charging means for charging a surface of said photoconductor;

image exposure means for exposing a charged surface of said photoconductor to a light image corresponding to an original image to be reproduced, using incoherent light, with said light image being divided into picture elements, thereby to form the latent electrostatic image on the surface of said photoconductor; and development means for developing said latent electrostatic image to a visible image, wherein said photoconductor comprises a function-separated photoconductor comprising an electroconductive support, an undercoat layer with a thickness of Tul formed on said electroconductive support, a charge generation layer formed on said undercoat layer, and a charge transport layer with a thickness of Tctl, which is no greater than 20 $\mu$m, formed on said charge generation layer, Tul and Tctl satisfying a relationship of Tul>Tctl/3.

2. The image formation apparatus as claimed in claim 1, wherein Tul and Tctl satisfies a relationship of Tul>Tctl/2.

3. An image formation apparatus comprising:

a photoconductor capable of forming a latent electrostatic image thereon;

charging means for charging a surface of said photoconductor;

image exposure means for exposing a charged surface of said photoconductor to a light image corresponding to an original image to be reproduced, using coherent light, with said light image being divided into picture elements, thereby to form the latent electrostatic image on the surface of said photoconductor; and development means for developing said latent electrostatic image to a visible image, wherein said photoconductor comprises a function-separated photoconductor comprising an electroconductive support, an undercoat layer with a thickness of Tul formed on said electroconductive support, a charge generation layer formed on said undercoat layer, and a charge transport layer with a thickness of Tctl, which is no greater than 20 $\mu$m, formed on said charge generation layer, Tul and Tctl satisfying a relationship of Tul>Tctl/3.

4. The image formation apparatus as claimed in claim 3, wherein Tul and Tctl satisfies a relationship of Tul>Tctl.

5. An image formation apparatus comprising:

a photoconductor capable of forming a latent electrostatic image thereon;

charging means for charging a surface of said photoconductor;

image exposure means for exposing a charged surface of said photoconductor to a light image corresponding to an original image having an image data including gradation information to be reproduced, using incoherent light, with said light image being divided into picture elements, thereby to form the latent electrostatic image on the surface of said photoconductor;

development means for developing said latent electrostatic image to a visible image; and gradation representing means for representing an image formation method based on the gradation information, wherein said gradation representing means is capable of inputting a driving signal to said image exposure means for controlling said image exposure means, based on image data of said original image, said driving signal having a predetermined minimum value, said photoconductor comprises a function-separated photoconductor comprising an electroconductive support, an undercoat layer with a thickness of Tul formed on said electroconductive support, a charge generation layer formed on said undercoat layer, and a charge transport layer with a thickness of Tctl, which is no greater than 20 $\mu$m, formed on said charge generation layer, Tul and Tctl satisfying a relationship of Tul>Tctl/2, said photoconductor having a differential sensitivity that is not more than ⅓ a maximum differential sensitivity of said photoconductor at a maximum exposure in an exposure distribution on the surface of said photoconductor at said predetermined minimum value of said driving signal, wherein said exposure distribution is represented by E(x,y) (joule/$m^2$) calculated by integrated a writing light energy distribution P(x, y, t) (watt/$m^2$) with respect to an exposure time, where (x, y) is a coordinate on the surface of said photoconductor, and an exposure diameter Db satisfying a relationship of Db>Tctl, and said exposure diameter Db is a smaller exposure diameter of at least one of an exposure diameter measured in a main scanning direction and an exposure diameter measured in a sub-scanning direction in an area on the surface of said photoconductor at least ½ the maximum exposure in the exposure distribution on the surface of said photoconductor at said predetermined minimum value of said driving signal.

6. The image formation apparatus as claimed in claim 5, wherein Tul and Tctl satisfies a relationship of Tul>Tctl.

7. An image formation apparatus comprising:

a photoconductor capable of forming a latent electrostatic image thereon;

charging means for charging a surface of said photoconductor;

image exposure means for exposing a charged surface of said photoconductor to a light image corresponding to an original image having gradation information to be reproduced, using coherent light, with said light image being divided into picture elements, thereby to form the latent electrostatic image on the surface of the photoconductor;

development means for developing said latent electrostatic image to a visible image; and gradation representing means for representing an image formation method based on the gradation information, wherein said gradation representing means is capable of inputting a driving signal to said image exposure means for controlling said image exposure means, based on said image data of said original image, said driving signal having a predetermined value, said photoconductor comprises a function-separated photoconductor comprising an electroconductive support, an undercoat layer with a thickness of Tul formed on said electroconductive support, a charge generation layer formed on said undercoat layer, and a charge transport layer with a thickness of Tctl, which is no greater than 20 $\mu$m, formed on said charge generation layer, Tul and Tctl satisfying a relationship of Tul>Tctl/2, said photoconductor having a differential sensitivity that is not more than ⅓ a maximum differential sensitivity of said photoconductor at a maximum exposure in an exposure distribution on the surface of said photoconductor at said predetermined minimum value of said driving signal, said exposure distribution is represented by E(x,y) (joule/$m^2$) calculated by integrating a writing light energy distribution P(x, y, t) (watt/$m^2$) with respect to an exposure time, where (x, y) is a coordinate on the surface of said photoconductor, and an exposure diameter Db satisfying a relationship of Db>2Tctl, and said exposure diameter Db is a smaller exposure diameter of at least one of an exposure diameter measured in a main scanning direction and an exposure diameter measured in a sub-scanning direction in an area on the surface of said photoconductor at least ½ the maximum exposure in the exposure distribution on the surface of said photoconductor at said predetermined minimum value of said driving signal.

8. The image formation apparatus as claimed in claim 7, wherein Tul and Tctl satisfies a relationship of Tul>Tctl.

9. An image formation apparatus comprising:

a photoconductor capable of forming a latent electrostatic image thereon;

charging means for charging a surface of said photoconductor;

image exposure means for exposing a charged surface of said photoconductor to a light image corresponding to an original image to be reproduced, through an optical lens, using part of light to which said original image is exposed, thereby to form the latent electrostatic image on the surface of said photoconductor; and development means for developing said latent electrostatic image to a visible image, wherein said photoconductor comprises a function-separated photoconductor comprising an electroconductive support, an undercoat layer with a thickness of Tul formed on said electroconductive support, a charge generation layer formed on said undercoat layer, and a charge transport layer with a thickness of Tctl, which is no greater than 20 μm, formed on said charge generation layer, Tul and Tctl satisfying a relationship of Tul>Tctl/3, wherein Tul and Tctl satisfies a relationship of Tul>Tctl/2.

10. An image formation apparatus comprising:

a photoconductor capable of forming a latent electrostatic image thereon;

a charging device configured to charge a surface of said photoconductor;

an image exposure device configured to expose a charged surface of said photoconductor to a light image corresponding to an original image to be reproduced, through an optical lens, using part of light to which said original image is exposed, thereby to form the latent electrostatic image on the surface of said photoconductor; and a development device configured to develop said latent electrostatic image to a visible image, wherein said photoconductor comprises a function-separated photoconductor comprising an electroconductive support, an undercoat layer with a thickness of Tul formed on said electroconductive support, a charge generation layer formed on said undercoat layer, and a charge transport layer with a thickness of Tctl, which is no greater than 20 μm formed on said charge generation layer, Tul and Tctl satisfying a relationship of Tul>Tctl/3.

11. The image formation apparatus as claimed in claim 10, wherein Tul and Tctl satisfies a relationship of Tul>Tctl/2.

12. An image formation apparatus comprising:

a photoconductor capable of forming a latent electrostatic image thereon;

a charging device configured to charge a surface of said photoconductor;

an image exposure device configured to expose a charged surface of said photoconductor to a light image corresponding to an original image to be reproduced, using incoherent light, with said light image being divided into picture elements, thereby to form the latent electrostatic image on the surface of said photoconductor; and a development device configured to develop said latent electrostatic image to a visible image, wherein said photoconductor comprises a function-separated type photoconductor comprising an electroconductive support, an undercoat layer with a thickness of Tul formed on said electroconductive support, a charge generation layer formed on said undercoat layer, and a charge transport layer with a thickness of Tctl, which is no greater than 20 μm formed on said charge generation layer, Tul and Tctl satisfying a relationship of Tul>Tctl/3.

13. The image formation apparatus as claimed in claim 12, wherein Tul and Tctl satisfies a relationship of Tul>Tctl/2.

14. An image formation apparatus comprising:

a photoconductor capable of forming a latent electrostatic image thereon;

a charging device configured to charge a surface of said photoconductor;

an image exposure device configured to expose a charged surface of said photoconductor to a light image corresponding to an original image to be reproduced, using coherent light, with said light image being divided into picture elements, thereby to form the latent electrostatic image on the surface of said photoconductor; and a development device configured to develop said latent electrostatic image to a visible image, wherein said photoconductor comprises a function-separated photoconductor comprising an electroconductive support, an undercoat layer with a thickness of Tul formed on said electroconductive support, a charge generation layer formed on said undercoat layer, and a charge transport layer with a thickness of Tctl, which is no greater than 20 μm formed on said charge generation layer, Tul and Tctl satisfying a relationship of Tul>Tctl/3.

15. The image formation apparatus as claimed in claim 14, wherein Tul and Tctl satisfies a relationship of Tul>Tctl.

16. An image formation apparatus comprising:

a photoconductor capable of forming a latent electrostatic image thereon;

a charging device configured to charge a surface of said photoconductor;

an image exposure device configured to expose a charged surface of said photoconductor to a light image corresponding to an original image having an image data including gradation information to be reproduced, using incoherent light, with said light image being divided into picture elements, thereby to form the latent electrostatic image on the surface of said photoconductor;

a development device configured to develop said latent electrostatic image to a visible image; and a gradation representing mechanism configured to represent an image formation method based on the gradation information, wherein said gradation representing mechanism is configured to input a driving signal to said image exposure device to control said image exposure device, based on said image data of said original image, said driving signal having a predetermined minimum value, said photoconductor comprises a function-separated photoconductor comprising an electroconductive support, an undercoat layer with a thickness of Tul formed on said electroconductive support, a charge generation layer formed on said undercoat layer, and a charge transport layer with a thickness of Tctl, which is no greater than 20 μm formed on said charge generation layer, Tul and Tctl satisfying a relationship of Tul>Tctl/2, said photoconductor having a differential sensitivity that is not more than ⅓ a maximum differential sensitivity of said photoconductor at a maximum exposure in an exposure distribution on the surface of said photoconductor at said predetermined minimum value of said driving signal, wherein said exposure distribution is represented by E(x,y) (joule/$m^2$) calculated by integrating a writing light energy distribution P(x, y, t) (watt/$m^2$) with respect to an exposure time, where (x, y) is a coordinate on the surface of said photoconductor, and an exposure diameter Db satisfying a relationship of Db>Tctl, and said exposure diameter Db is a smaller exposure diameter of at least one of an exposure diameter measured in a main scanning direction and an exposure diameter measured in a sub-scanning direction in an area on the surface of said photoconductor at least ½ the maximum exposure in the exposure distribution on the surface of said photoconductor at said predetermined minimum value of said driving signal.

17. The image formation apparatus as claimed in claim 16, wherein Tul and Tctl satisfies a relationship of Tul>Tctl.

18. An image formation apparatus comprising:

a photoconductor capable of forming a latent electrostatic image thereon;

a charging device configured to charge a surface of said photoconductor;

an image exposure device configured to expose a charged surface of said photoconductor to a light image corresponding to an original image having gradation information to be reproduced, using coherent light, with said light image being divided into picture elements, thereby to form the latent electrostatic image on the surface of said photoconductor;

a development device configured to develop said latent electrostatic image to a visible image; and a gradation representing mechanism configured to represent an image formation method based on the gradation information, wherein said gradation representing mechanism is configured to input a driving signal to said image exposure device to control said image exposure device, based on said image data of said original image, said driving signal having a predetermined value, said photoconductor comprises a function-separated photoconductor comprising an electroconductive support, an undercoat layer with a thickness of Tul formed on said electroconductive support, a charge generation layer formed on said undercoat layer, and a charge transport layer with a thickness of Tctl, which is no greater than 20 μm formed on said charge generation layer, Tul and Tctl satisfying a relationship of Tul>Tctl/2, said photoconductor having a differential sensitivity that is not more than ⅓ a maximum differential sensitivity of said photoconductor at a maximum exposure in an exposure distribution on the surface of said photoconductor at said predetermined minimum value of said driving signal, said exposure distribution is represented by E(x,y) (joule/$m^2$) calculated by integrating a writing light energy distribution P(x, y, t) (watt/$m^2$) with respect to an exposure time, where (x, y) is a coordinate on the surface of said photoconductor, and an exposure diameter Db satisfying a relationship of Db>2Tctl, and said exposure diameter Db is a smaller exposure diameter of at least one of an exposure diameter measured in a main scanning direction and an exposure diameter measured in a sub-scanning direction in an area on the surface of said photoconductor at least ½ the maximum exposure in the exposure distribution on the surface of said photoconductor at said predetermined minimum value of said driving signal.

19. The image formation apparatus as claimed in claim 18, wherein Tul and Tctl satisfies a relationship of Tul>Tctl.

* * * * *